United States Patent
Imanishi et al.

(10) Patent No.: US 6,981,371 B2
(45) Date of Patent: Jan. 3, 2006

(54) CONTROL DEVICE FOR WORKING MACHINE

(75) Inventors: Etsujiro Imanishi, Kobe (JP); Naoki Sugano, Kobe (JP); Takao Nanjo, Kobe (JP)

(73) Assignee: Kobelco Construction Machinery Co., LTD, Hiroshima (JP)

( * ) Notice: Subject to any disclaimer, the term of this patent is extended or adjusted under 35 U.S.C. 154(b) by 23 days.

(21) Appl. No.: 10/846,557

(22) Filed: May 17, 2004

(65) Prior Publication Data

US 2004/0231326 A1 Nov. 25, 2004

(30) Foreign Application Priority Data

May 22, 2003 (JP) ............................. 2003-145376

(51) Int. Cl.
*F15B 11/00* (2006.01)
(52) U.S. Cl. ......................................... 60/420; 60/445
(58) Field of Classification Search ................ 60/420, 60/422, 445, 452, 484
See application file for complete search history.

(56) References Cited

U.S. PATENT DOCUMENTS 4,507,057 A * 3/1985 Igarashi et al. ............... 60/452
5,356,259 A * 10/1994 Hanamoto et al. .......... 414/694
5,394,696 A * 3/1995 Eich et al. .................... 60/420
6,282,890 B1 * 9/2001 Takano ......................... 60/420

FOREIGN PATENT DOCUMENTS

JP 10-246204 9/1998
JP 2002-38536 2/2002

* cited by examiner

*Primary Examiner*—Thomas E. Lazo
(74) *Attorney, Agent, or Firm*—Oblon, Spivak, McClelland, Maier & Neustadt, P.C.

(57) ABSTRACT

A control device for a working machine according to the present invention comprises a capacity variable pump for supplying working oil, a controller for controlling the discharge amount of the pump, a control valve for controlling the working oil discharged from the pump, a hydraulic actuator operated by the working oil from the control valve, an operating lever for operating the hydraulic actuator, and a relief valve to be operated when the pressure of the working oil is a relief pressure or more. The controller has a dynamic emulation model of a hydraulic driving device, and is constituted to estimate the pressure oil flow rate passing through the relief valve from the emulation model according to the operation amount of the operating lever, and to control the pump flow rate of the pump so that the relief flow rate estimation value gets close to zero. According to this, relief loss can be precisely reduced without generating a response delay or pressure loss, and the power can be saved.

11 Claims, 7 Drawing Sheets

CONTROL DEVICE FOR WORKING MACHINE

BACKGROUND OF THE INVENTION

1. Field of the Invention

The present invention relates to a hydraulic control device for a hydraulic working machine.

2. Description of the Related Art

When a large load acts on an actuator such as a hydraulic cylinder in the hydraulic circuit of a working machine, the internal pressure of the hydraulic circuit is raised. This circuit has a relief valve in order to protect hydraulic equipment within the circuit. When a circuit pressure exceeds a relief pressure, working oil is released to a tank through the relief valve. Accordingly, the pressure is prevented from becoming excessive to prevent the breakage of the hydraulic equipment.

However, most of the working oil supplied from a pump is directly released to the tank without being supplied to the actuator. Therefore, most of the pump power is consumed as the loss of the relief valve, causing a reduction in energy efficiency.

Therefore, a cut-off control for reducing the discharge flow rate of the hydraulic pump is performed in the operation of the relieve valve.

Concretely, as a means for reducing the relief flow rate and relief loss, a throttle means is provided on the downstream side of the relief valve to reduce the pump flow rate when the upstream pressure of the throttle means is increased (e.g. Japanese Patent Application Laid-Open No. 10-246204) or to reduce the pump flow rate when the temperature of the relief valve is raised (e.g., Japanese Patent Application Laid-Open No. 2002-038536).

In the former, however, since the throttle means is provided on the downstream of the relief valve, a pressure loss is generated by the throttle means, and the energy efficiency of the system cannot be improved sufficiently. Further, when a sudden lever operation is performed, a sudden change in pressure is caused because the pump flow rate is suddenly reduced with the sudden increase in the relief flow rate, and hunching is caused according to this.

In the latter, since the temperature of the relief valve is raised with time lag (time delay) from the generation of the relief flow rate, time lag is generated between the generation of the relief flow rate and the cutoff of the pump flow rate, and a sufficient relief loss reducing effect cannot be obtained. Further, since residual heat is detected even after the relief flow rate becomes 0, the pump flow rate is cut off, and a required driving force cannot be immediately obtained.

SUMMARY OF THE INVENTION

The present invention thus has an object to provide a control device for a working machine capable of properly reducing the relief loss without generating a response delay or pressure loss and effectively saving the power consumption of a hydraulic pump.

The control device for a working machine of the present invention has the following basic structure.

Namely, the control device for a working machine comprises a capacity variable hydraulic pump for supplying working oil, a controller for controlling the discharge amount of the capacity variable hydraulic pump, a control valve for controlling the working oil discharged from the capacity variable hydraulic pump, a hydraulic actuator adapted to be worked by the working oil from the control valve, an operating means for operating the hydraulic actuator, and a relief valve adapted to be operated when the pressure of the working oil is a predetermined relief pressure or more. Further, the controller has a dynamic emulation model of a hydraulic driving device, and is constituted so as to estimate the pressure oil flow rate passing through the relieve valve from the dynamic emulation model according to the operation amount of the operating means and to control the pump flow rate of the capacity variable hydraulic pump so that flow rate estimation value of the relief valve gets close to zero.

This dynamic emulation model is suitably constituted so as to have each specification of a pressure control valve including the relief valve, the hydraulic pump, the hydraulic actuator, and the control valve within the model.

The dynamic emulation model is suitably constituted so as to have nonlinear characteristics of the control valve or the pressure control valve.

According to the present invention, when the operating means is operated, the controller simulates the dynamic characteristic of the hydraulic driving device by use of the dynamic emulation model in real time. As a result of this simulation, the pressure oil flow rate passed through the relief valve is estimated, and the pump flow rate of the capacity variable pump is controlled so that the relief flow rate estimation value gets close to zero. Accordingly, the relief loss can be properly reduced to so as to save the power of the hydraulic pump effectively.

Since the method of detecting the operation amount is adapted, time lag is not generated as in the related art in which the temperature of the relief valve is detected. Accordingly, conventional problems can be solved, including the problem that a sufficient relief loss reducing effect cannot be obtained due to the time lag from the relief flow rate generation to the cutoff of the pump flow rate, and the problem that a sufficient driving force cannot be obtained since the pump flow rate is continuously cut off even after the relief flow rate becomes zero.

Since no throttle means is provided on the downstream side of the relief valve as in a conventional cutoff control, according to the present invention, the energy efficiency can be further enhanced without generation of excessive pressure loss.

DESCRIPTION OF THE PREFERRED EMBODIMENTS

A control device for a working machine of the present invention will be described according to a preferred embodiment in reference to the drawings.

Figure 1:
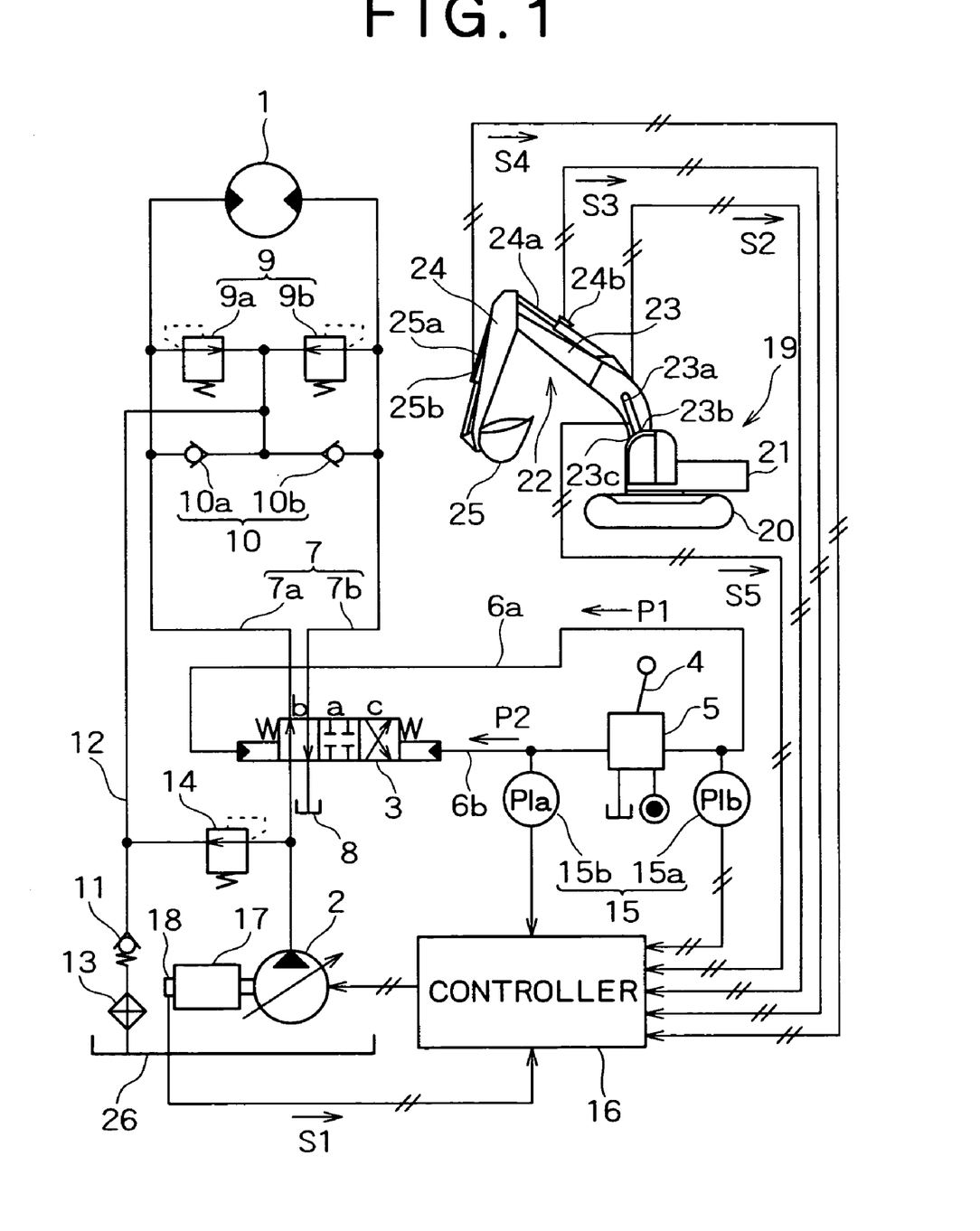
FIG. 1 is a hydraulic circuit view showing the structure of a hydraulic control device according to an embodiment of the present invention.

FIG. 1 shows the hydraulic circuit of a hydraulic control device as the control device of the present invention.

In the same figure, denoted at 1 is a hydraulic motor as one example of a hydraulic actuator, and 2 is a capacity variable hydraulic pump for supplying working oil to the actuator.

Denoted at 3 is a control valve for controlling the flow rate and direction of the working oil supplied to the motor 1. When an operating lever 4 as the operating means is operated, pilot pressure P1 (or P2) derived from a remote control valve 5 acts on either one pilot port of the control valve 3 through a pilot line 6a (or 6b) to switch the control valve 3 from a neutral position (a) to a position (b) or (c).

When the control valve 3 is switched to the b-position, the pressure oil from the hydraulic pump 2 is supplied to the hydraulic motor 1 through one supply and discharge passage 7a of a supply and discharge passage 7, and return oil is returned to an oil tank 8 (hereinafter simply referred to as tank) through the other supply and return passage 7b.

When the control valve 3 is switched to the c-position, the pressure oil is supplied to the hydraulic motor 1 conversely through the supply and discharge passage 7b, and the return oil is returned to the tank 8 through the supply and discharge passage 7a.

Denoted at 9a and 9b are port relief valves. Denoted at 10a and 10b are makeup check valves for preventing cavitation in a pipe when the pump flow rate is insufficient to the actuator flow rate consumption, and each valve functions as a brake valve as a whole.

Denoted at 11 is a back-pressure check valve provided in a return line (return pipeline) 12 in order to ensure back pressure for the makeup, 13 is an oil cooler, and 14 is a main relief valve for keeping the circuit pressure constant.

Various valves including the port relief valves 9a, 9b and the main relief valve 14 often collectively mean a pressure control valve.

Denoted at 15a and 15b are pressure sensors for detecting the pilot pressure of the pilot lines 6a and 6b. Pilot pressure signals PIa, PIb outputted from the pressure sensors 15a, 15b are given to a controller 16.

The pressure sensors 15a and 15b often collectively mean a pressure sensor 15.

The controller 16 controls the discharge amount Qp of the hydraulic pump 2 through a regulator (not shown) based on the pilot pressure signal PI outputted from the pressure sensor 15.

An engine 17 as a driving source of the hydraulic pump 2 has a rotation speed sensor 18 for detecting a speed or a rotation speed of an engine 17. Rotation speed signal S1 outputted from the rotation speed sensor 18 is given to the controller 16.

Further, each sensor mounted on a front attachment 22 of a construction machine 19 is also connected to the controller 16. A hydraulic excavator 19 to which the hydraulic control device of this embodiment is applied comprises an upper rotating body 21 rotatably mounted on a lower traveling body 20. The front attachment 22 is provided on the front part of the upper rotating body 21.

The front attachment 22 comprises a boom 23 raised and lowered by the extension and contraction of a boom cylinder 23a, an arm cylinder 24 longitudinally rotated by the expansion and contraction of an arm cylinder 24a, and a bucket 25 longitudinally rotated by the expansion and contraction of a bucket cylinder 25a. Denoted at 23b is a boom cylinder stroke sensor provided on the boom cylinder 23a, 23c is a boom cylinder pressure sensor, 24b is an arm cylinder stroke sensor provided on the arm cylinder 24a, and 25b is a bucket cylinder stroke sensor provided on the bucket cylinder 25a. Each of the stroke sensors and pressure sensor functions as a detecting means for detecting position and work load of the front attachment 22.

Signals S2–S4 showing the position of the front attachment 22 and a signal S5 showing the load of the front attachment 22, each of which is outputted from each stroke sensor 23b, 24b, 25b, are also given to the controller 16.

Figure 2:
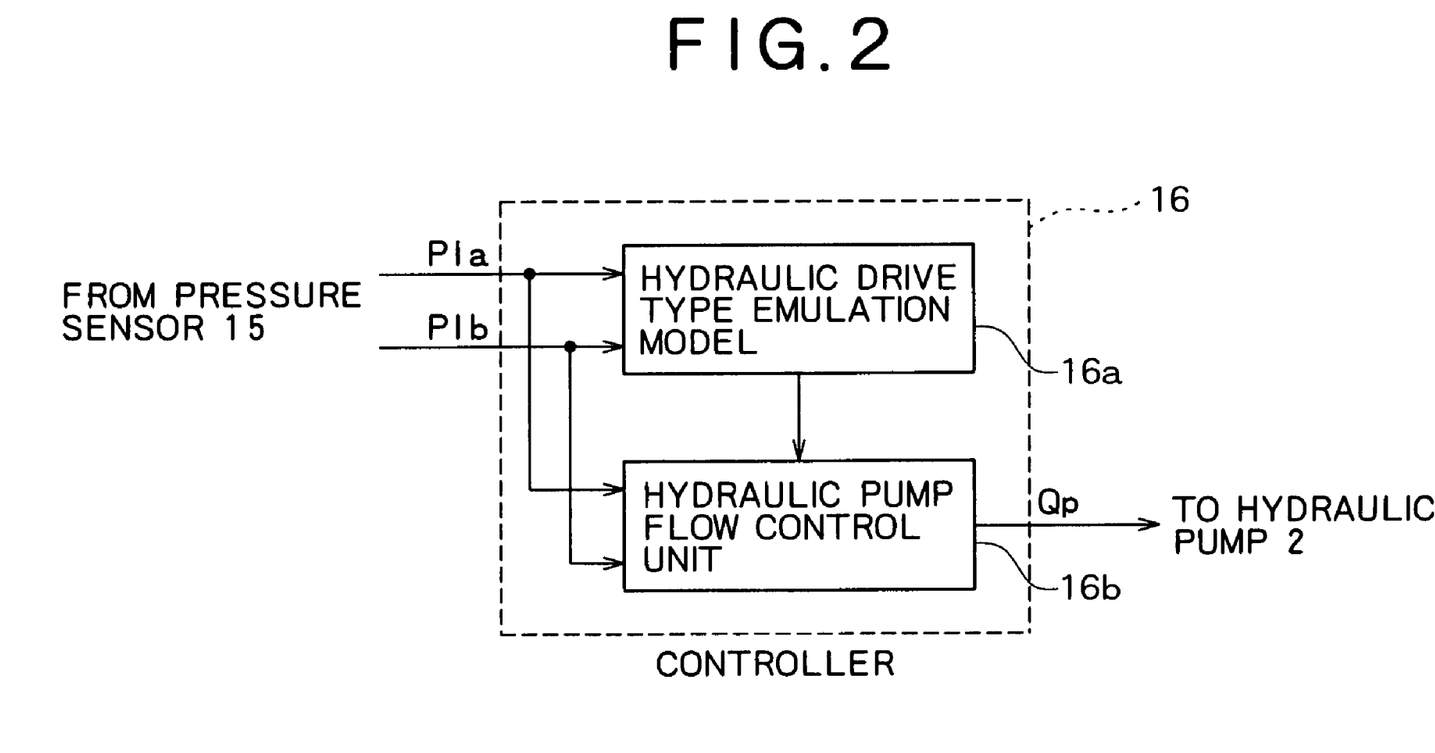
FIG. 2 is a block view showing the internal structure of a controller shown in FIG. 1.

The internal structure of the controller 16 is shown in FIG. 2.

In the drawing, the controller 16 calculates, on receipt of the pilot pressure signals PIa, PIb outputted from the pressure sensors 15a, 15b, the relief valve flow rate in an operation amount given by the operating lever 4 by use of a hydraulic driving system emulation model 16a preliminarily stored therein.

Figure 3:
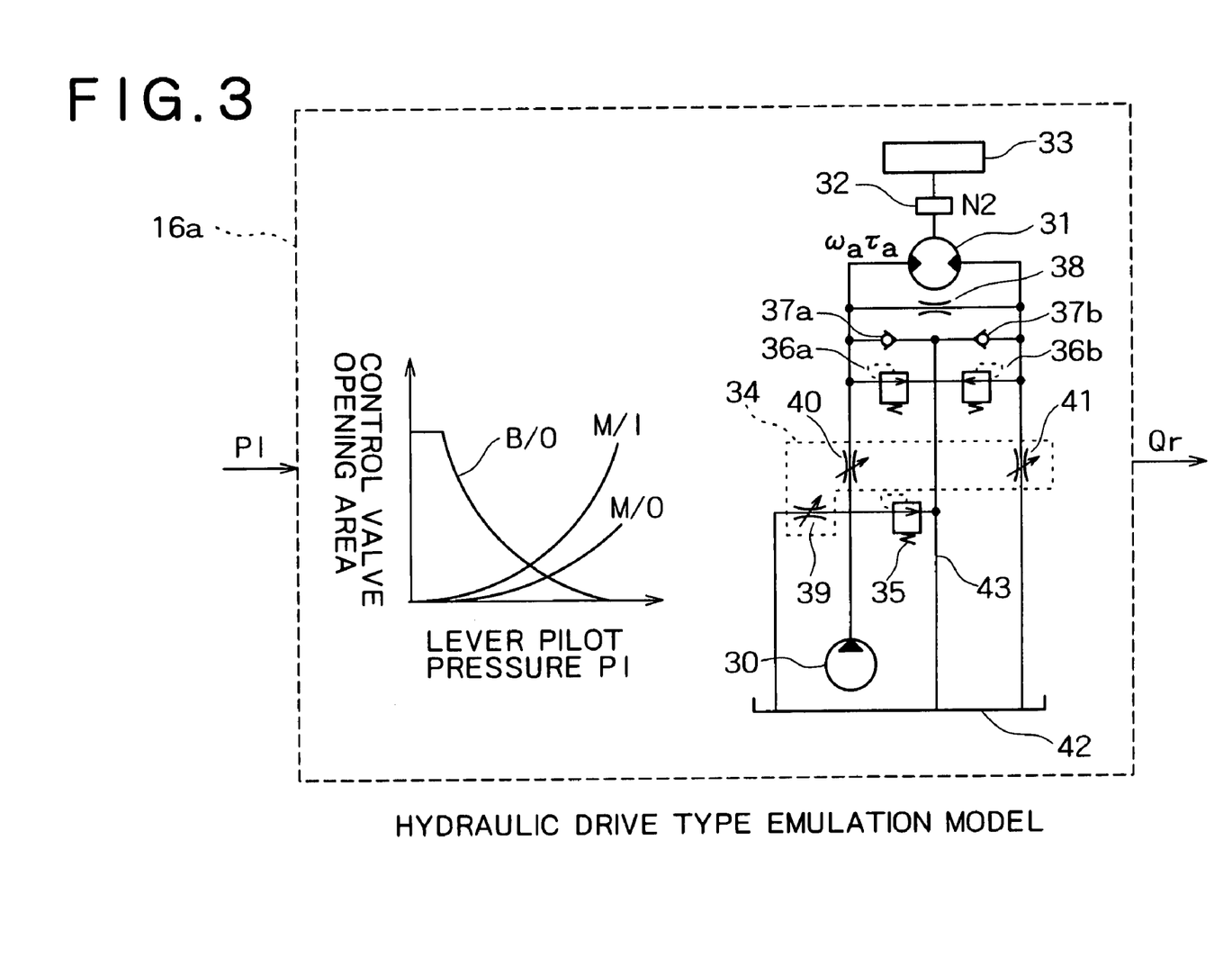
FIG. 3 is an explanatory view showing an emulation model according to the embodiment.

FIG. 3 shows the emulation model 16a.

The emulation model 16a shown in the drawing shows a drive system for a rotating system. This system mainly comprises a hydraulic pump 30, a hydraulic motor 31, a reduction gear 32 connected to the output shaft of the hydraulic motor 31, a rotation inertial weight 33 connected to the rotating shaft of the reduction gear 32, a control valve 34 for supplying the pressure oil discharged from the hydraulic pump 30 while controlling its flow rate and direction, a main relief valve 35, port relief valves 36a, 36b, check valves 37a, 37b, and a bypass valve 38.

Various valves including the port relief valves 36a, 36b and the main relief valve 35 often collectively mean a pressure control valve.

The control valve 34 comprises a bleed-off valve (B/O) 39, a meter-in valve (M/I) 40, and a meter-out (M/O) 41. Denoted at 42 is a tank.

In this emulation model, the bleed-off opening (the curve shown by B/O in the figure) is throttled more as the pilot pressure PI becomes larger, as shown by the characteristic of nonlinear control valve opening area shown on the left side of the model. On the contrary, a meter-in opening (the curve shown by M/I in the figure) and a meter-out opening (the curve shown by M/O in the drawing) are opened. Consequently, the pressure oil flow rate to be supplied to the hydraulic motor 31 is increased.

The governing equations of the emulation model 16a are described below.

$$J_L(2\pi/qN_2)\omega_a = P_{mi} - P_{mo} \tag{1}$$

$$P_{mi} = K/V_{mi}(Q_{mi} - Q_a - Q_{r1} + Q_{c1}) \tag{2}$$

$$P_{mo} = K/V_{mo}(Q_a - Q_{mo} - Q_{r2} + Q_{c2}) \tag{3}$$

$$P_p = K/V_p(Q_p - Q_{bo} - Q_{mi} - Q_{rp}) \tag{4}$$

$$A_{bo} = f_{bo}(S), A_{mi} = f_{mi}(S), A_{bo} = f_{bo}(S) \tag{5}$$

$$Q_{bo} = CvA_{bo}\sqrt{(2P_p/\gamma)} \tag{6}$$

$$Q_{mi} = CvA_{mi}\sqrt{(2(P_p - P_{mi})/\gamma)} \tag{7}$$

$$Q_{mo} = CvA_{mo}\sqrt{(2P_{mo}/\gamma)} \tag{8}$$

$$Q_a = qN\omega_a/2\pi \tag{9}$$

wherein JL: moment of inertia of load, P: pressure, Q: flow rate, K: oil volume elasticity, V: pipe inner capacity, A: area, L: length, CV: flow coefficient, γ: oil specific gravity, λ: friction coefficient of pipe, D: pipe diameter, S: control lever amount, N: reduction ratio, q: hydraulic motor capacity, and ω: rotation speed. As subscripts, bo: bleed-off, mi: meter-in, mo: meter-out, p: pump, a: hydraulic motor, c: check valve, r: port relief valve, rp: main relief valve, pi: pipe part, 1: upstream side, and 2: downstream side.

In the above equations, as the specification of the hydraulic pump 30 that is the hydraulic source, hydraulic pump flow rate $Q_p$ is given to the equation (4).

As the characteristic of the actuator, hydraulic motor capacity q is given to the equation (1).

As the characteristic of the control valve 34, the relation of each opening area Abo, Ami, Amo of the bleed-off valve 39, meter-in valve 40, and meter-out valve 41 respectively constituting the control valve 34 with the lever operation amount S is given to the equation (5).

When the rotation speed is changed, the hydraulic pump flow rate is changed. Therefore, the rotation speed signal S1 outputted from the rotation speed sensor 18 mounted on the engine 17 is loaded to the controller 16, and the hydraulic pump discharge flow rate of the emulation model 16a is changed according to the loaded rotation speed.

The rotating moment of inertia of the upper rotating body 21 is changed according to the position or load of the front attachment 22. Therefore, a control is carried out. Namely, each signal S2–S5 outputted from the boom cylinder stroke sensor 23b, the arm cylinder stroke sensor 24b, the bucket cylinder stroke sensor 25b and the boom cylinder pressure sensor 23c respectively is detected. These signals are loaded to the controller 16. The position and load of the front attachment 22 are calculated based on these signals, and the moment of inertia of JL of the emulation model 16a is changed. According to this, the dynamic characteristic of a hydraulic driving device close to the actual working state can be simulated.

In the emulation model of this embodiment, a numerical integration method, for example, the Newmark-β method is applied to the system of these governing equations (controlling equations), whereby time history response operation is carried out.

The controlling operation of the controller 16 will be described.

The controller 16 estimates the relief flow rate Qr from the pump pressure measurement value PI by use of the emulation model 16a.

Figure 4:
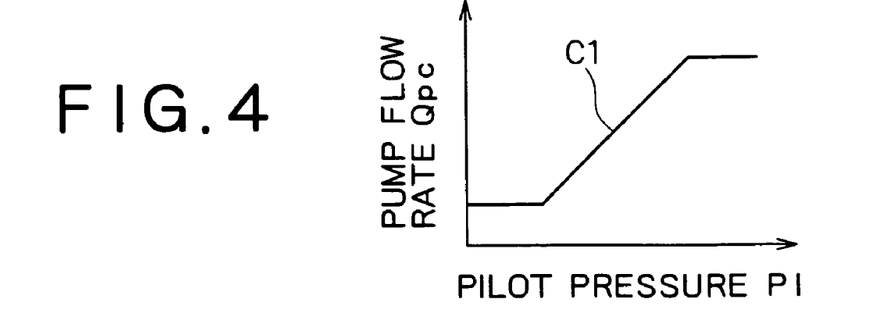
FIG. 4 is a graph showing the relation between pilot pressure and pump flow rate.

A hydraulic pump flow control unit 16b determines the pump flow rate according to the following equation by use of the above-mentioned relief flow rate estimation value.

$$Qp = Qpc - Qcut = Qpc - G \times Qr \quad (10)$$

wherein Qpc is a pump flow rate without this control of this embodiment, and it is given as the characteristic C1 shown in FIG. 4 according to the pilot pressure PI.

In the control according to this embodiment, as shown in the equation (10), the cutoff flow rate Qcut obtained by multiplying the relief flow rate estimation value Qr by a gain G is subtracted from Qpc, whereby the pump flow rate Qp is determined.

In the acceleration of the actuator, the actuator flow consumption Qa becomes smaller than the pump flow rate Qp due to the response delay by inertia or the like of the actuator to the pump flow rate Qp, generating an excessive flow rate Qex=Qp-Qa. In a half-lever area, the excessive flow rate is released to the tank 42 through the bleed-off valve 39. When a full-lever acceleration is performed, the excessive flow rate Qex is released to the tank 42 through the main relief valve 35 since the bleed-off valve 39 is closed up (refer to FIG. 3).

The excessive flow rate is compared between the case with the control of this embodiment and the case without the control. The excessive flow rate Qex1 without this control is represented by the following equation (11).

$$Qex1 = Qpc - Qa \quad (11)$$

The excessive flow rate Qex2 with the control of this embodiment is represented by the following equation (12).

$$Qex2 = Qpc - Qcut - Qa \quad (12)$$

Accordingly, when the control of this embodiment is performed, the excessive flow rate released to the tank 26 through the relief valve 14 shown in FIG. 1 is reduced by the portion of Qex1−Qex2=Qcut, compared with the case without the control. If the excessive flow rate is reduced in this way, the pressure loss in the relief valve 14 is reduced, and the energy efficiency of the hydraulic circuit can be enhanced.

Further, in the control of this embodiment, the cutoff flow rate Qcut is determined, as shown in the equation (10), by multiplying the relief flow rate estimation value Qr by the proportional gain G. Therefore, the cutoff flow rate Qcut is increased and decreased according to the relief flow rate Qr. Since the cutoff flow rate Qcut is increased by this effect when the relief flow rate Qr is large, the improvement in energy efficiency can be enhanced.

When the relief flow rate Qr is small, the cutoff flow rate Qcut is minimized. Therefore, the problem that the pump flow rate is reduced more than necessary to deteriorate the responsiveness of the actuator as in a conventional control of equally suppressing the pump flow rate can be solved.

Although the cutoff flow rate Qcut is determined by using the method of multiplying the relief flow rate by the gain G or a proportional operation in the equation (10), an integrating operation or differential operation that is a conventional control method may be added. According to this method, steady deviation can be reduced, or the responsiveness can be improved.

The controlling operation of this embodiment will be described in reference to FIGS. 5A–5C.

Figure 5A:
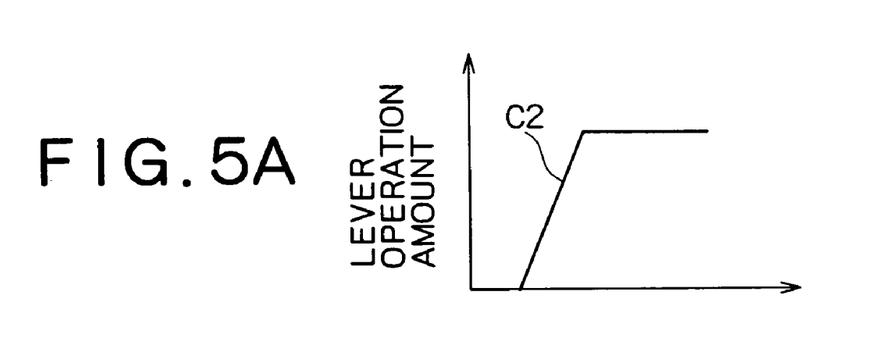
FIGS. 5A–5C are explanatory views showing a controlling operation of the present invention.
Figure 5B:
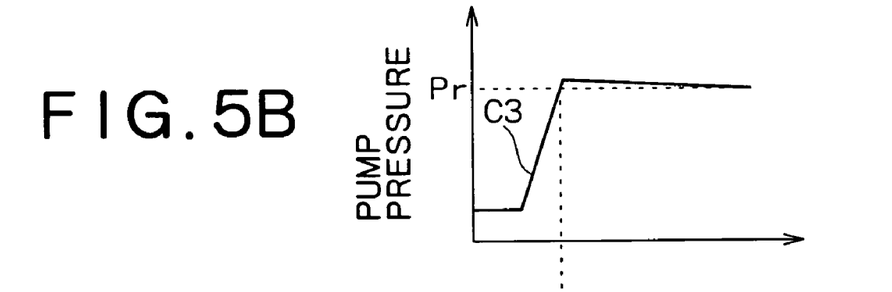
Figure 5C:
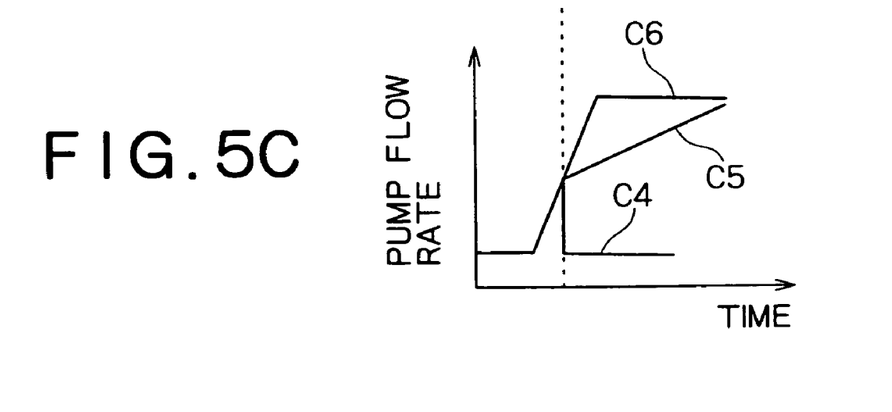
Figure 6A:
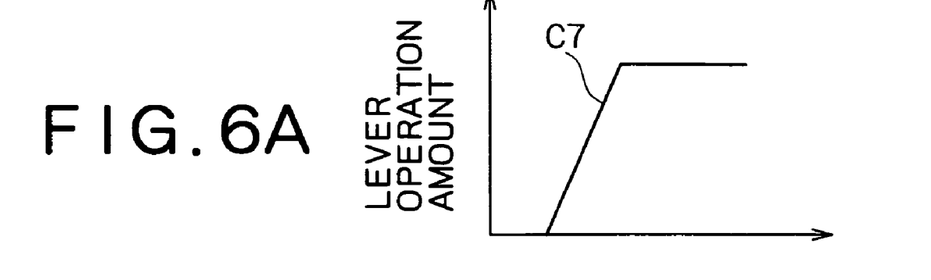
FIGS. 6A–6D are graphs showing cases without control as comparative examples.
Figure 6B:
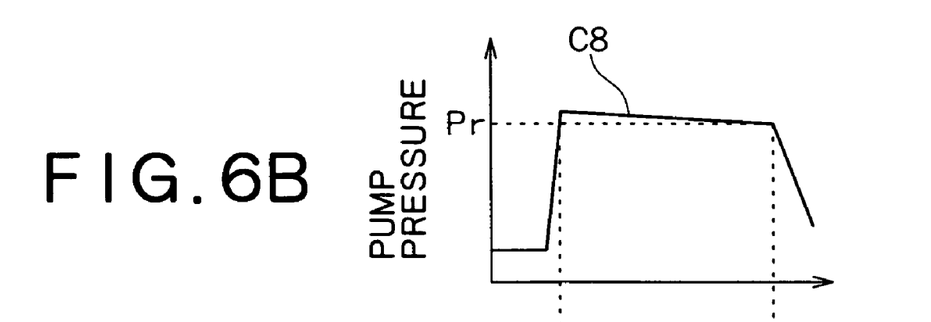
Figure 6C:
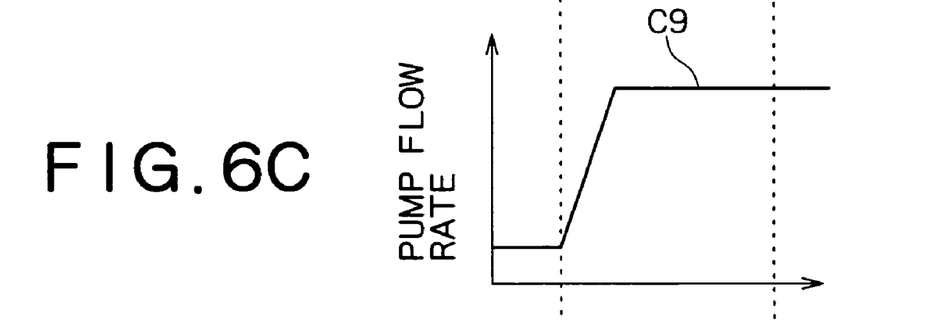
Figure 6D:
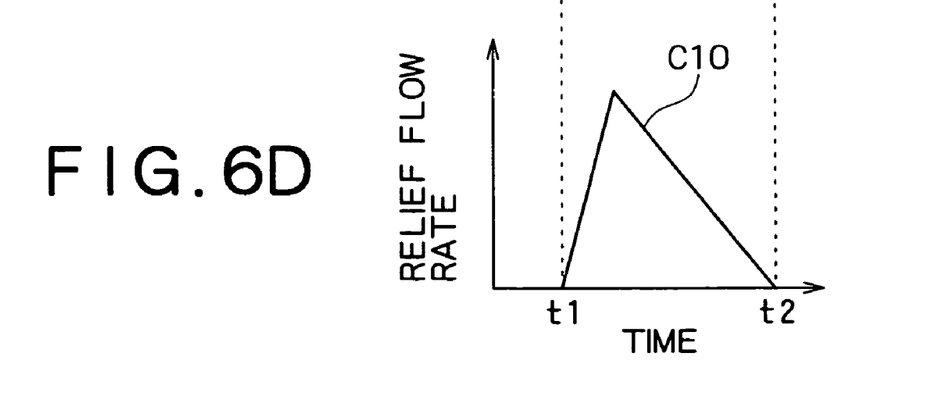

As shown by characteristic C2 of FIG. 5A, when the lever 4 (refer to FIG. 1) is suddenly full-operated from the neutral position, the response delay by inertia or the like of the actuator is generated to the pump flow rate Qp. Therefore, the actuator flow consumption Qa becomes smaller than the pump flow rate Qp, and the working oil is filled in the pump-side pipe. Consequently, since the pump pressure rises and exceeds the relief pressure Pr as shown by characteristic C3 of FIG. 5B, the relief valve 14 is operated (opened).

When the gain G is large, the cutoff flow rate Qcut is increased as shown in the equation (10). Therefore, the pump flow rate Qp is suddenly reduced as shown by characteristic C4 of FIG. 5C. The sudden reduction of the pump flow rate Qp can be solved, as shown by characteristic C5, by limiting the time change amount of the pump flow rate Qp. Further, the actuator is increased in speed with the time to increase the actuator flow rate, whereby the relief flow rate is reduced. Therefore, the cutoff flow rate Qcut is minimized with the time, and the pump flow rate is gently increased. Characteristic C6 is a conventional pump flow rate characteristic shown for comparison.

FIGS. 6A–6D and FIGS. 7A–7D are graphs for describing the effects by the control of this embodiment.

FIGS. 6A–6D show the operation without the above control shown for comparison. When the operating lever 4 is suddenly full-operated from the neutral position, as shown by characteristic C7 of FIG. 6A, the pump pressure rises and exceeds the relief pressure Pr as shown by characteristic C8 of FIG. 6B, whereby the relief valve is operated, and most of the pump flow rate is released to the tank 26 through the relief valve 14 in spite of the supply of the pump flow rate (refer to characteristic C9 of FIG. 6C). Therefore, the pressure loss of the relief valve 14 is increased to deteriorate the energy efficiency (refer to characteristic C10 of FIG. 6D).

When the cutoff control according to this embodiment is performed the pump flow rate is suddenly reduced in the generation of the relief flow rate if the gain G of the equation (10) is large, and the pump pressure is reduced to the relief pressure or less. In this case, since the cutoff flow rate is zero, the pump flow rate is rapidly increased. Then, the pump pressure exceeds the relief pressure again to generate the relief flow rate, and the pump flow rate is cut off and rapidly reduced. When such a rapid fluctuation of pump flow rate and relief flow rate is repeated in a short time, a hunching state might be caused.

Figure 7A:
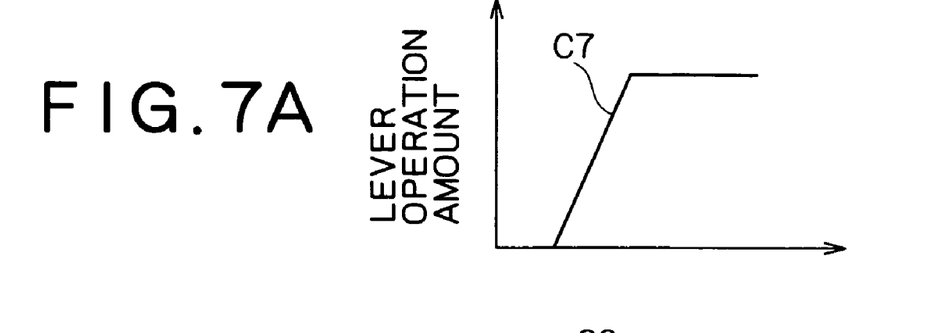
FIGS. 7A–7D are views corresponding to FIGS. 6A–6D for illustrating the relief flow rate reducing effect by the present invention.
Figure 7B:
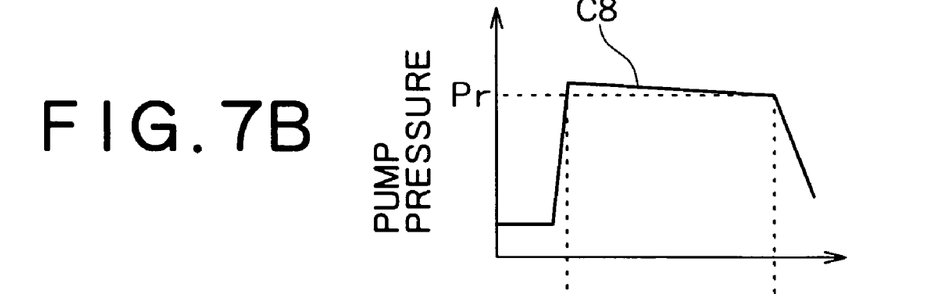
Figure 7C:
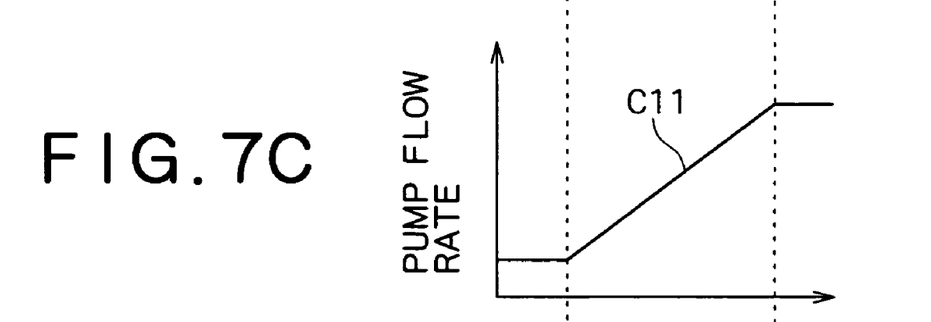
Figure 7D:
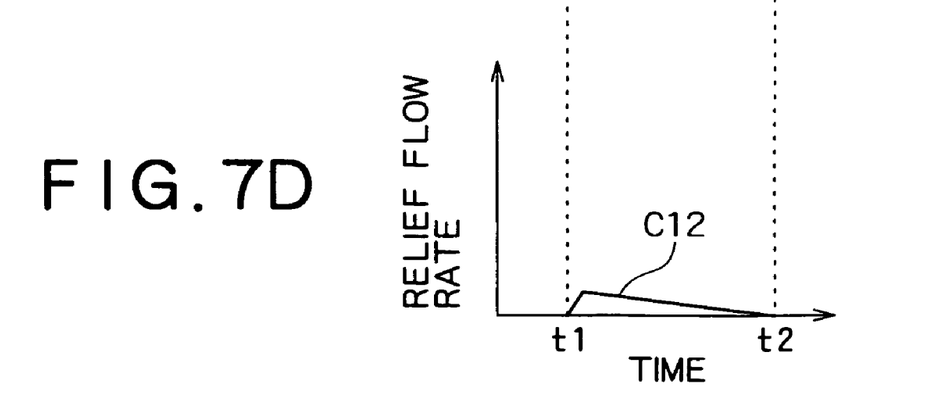

Therefore, in this embodiment, when the relief flow rate is generated as mentioned above, the pump flow rate is controlled to gently increase as shown by characteristic C11 of FIG. 7C. Therefore, the relief flow rate is effectively reduced as shown by characteristic C12 of FIG. 7D, compared with the relief flow rate without the control in FIG. 6D. Accordingly, the relief loss can be reduced to enhance the energy efficiency.

In this embodiment, the controller 16 can be constituted so as to limit the pump flow rate change per unit time to a fixed value or less to prevent the sudden change in the pump flow rate of the capacity variable pump. Concretely, the time change amount of a pump flow instruction value is limited, or a transitional response such as primary delay, moving average or rate limiter is given to the pump flow instruction value. According to this, even if a sudden lever operation is performed, the sudden reduction in pump flow rate can be suppressed although the relief flow rate is rapidly increased, and the hunching can be prevented.

Figure 8:
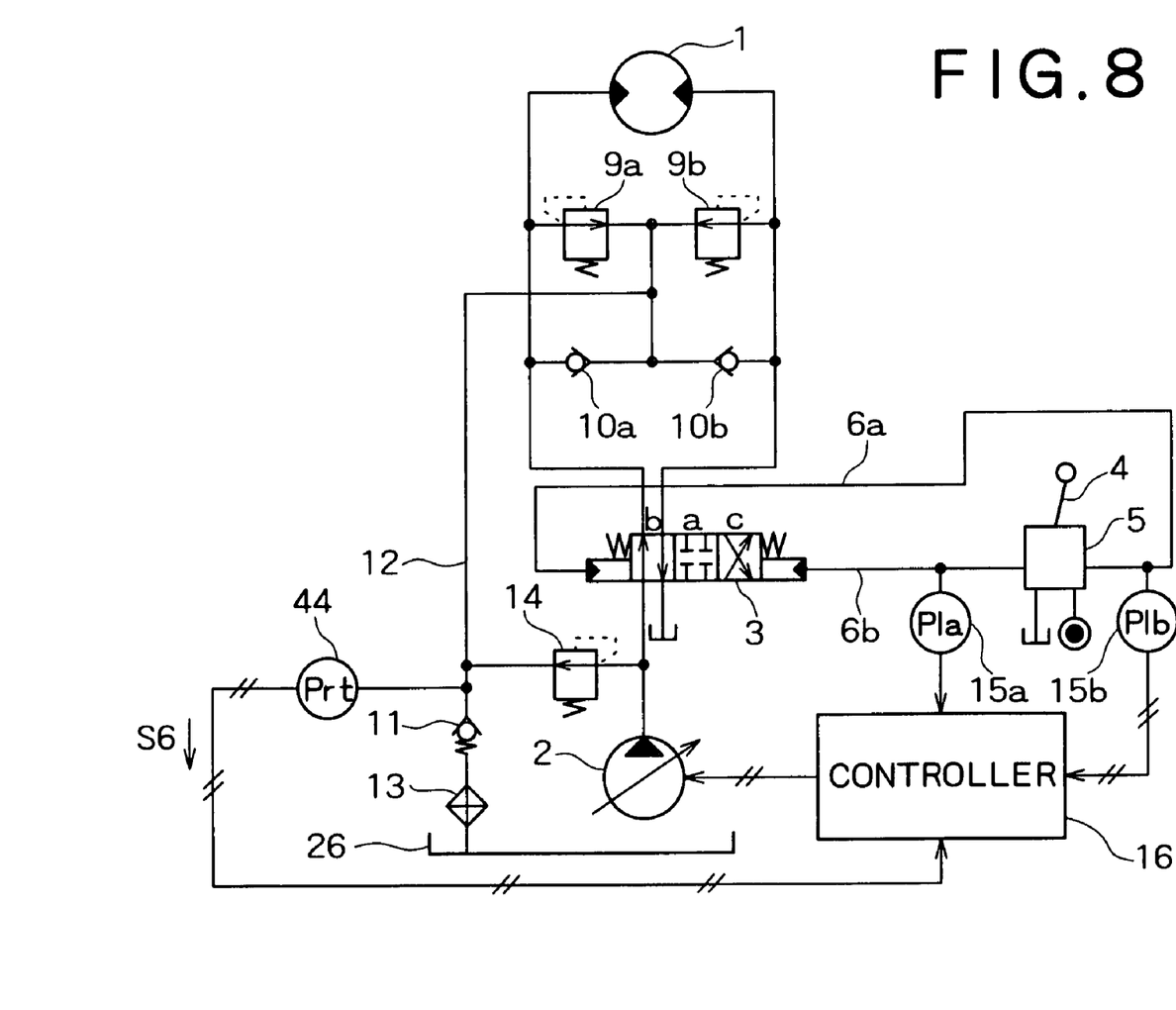
FIG. 8 is a hydraulic circuit view showing a second embodiment of the present invention.

FIG. 8 shows the second embodiment of the hydraulic control device according to the present invention.

The same reference marks are given to the same components as in FIG. 1 to omit the descriptions therefor.

In FIG. 8, a back-pressure check valve 11 and an oil cooler 13 are provided on the return pipe 12 communicating with the tank 26. When a hydraulic cylinder (not shown) is further provided in addition to the hydraulic motor 1 as actuator, the working oil returned through the return pipe 12 or the return-side flow rate is increased by the area-size difference between the head side and rod side of the cylinder in the contracting directional use of the cylinder. Therefore, the pressure loss of the back-pressure check valve 11 and the oil cooler 13 may be increased to raise the pressure in the return pipe 12.

In an excavating work, for example, the arm of the front attachment is operated in a releasing direction, whereby the arm cylinder is operated in the contracting direction.

In this case, the pressure of the return pipe 12 is measured by a pressure sensor 44, and the measured pressure signal S6 is given to the controller 16. In the controller 16, the pressure signal S6 is made to work as the pressure of the back pressure-side pipe 43 of the relief valve 35 (refer to FIG. 3), whereby the relief flow rate Qr is estimated. Namely, the controller 16 may be constituted so as to correct the pump pressure of the hydraulic pump 2 in the emulation model based on the back pressure detected by the pressure sensor 44, and to estimate the relief flow rate based on the corrected pump pressure and the flow characteristic of the relief valve 35.

In this structure, even if the pressure in the return pipe 12 is raised by the increase of the return flow rate, the relief flow rate Qr is estimated considering the influence. Therefore, the precision of relief flow rate estimation can be improved, and the relief pressure loss can be effectively reduced to enhance the energy efficiency.

As the hydraulic actuator according to the present invention, a hydraulic motor of a rotating system is described as an example in the above embodiment. The actuator may be constituted as either of a winch motor as the driving source of a hoisting system and a traveling motor as the driving source of a traveling system, or the combination thereof.

Although the invention has been described with reference to the preferred embodiments in the attached figures, it is noted that equivalents may be employed and substitutions made herein without departing from the scope of the invention as recited in the claims.

We claim:

1. A control device for a working machine comprising:
    a capacity variable hydraulic pump for supplying working oil;
    a controller for controlling a discharge amount of said capacity variable hydraulic pump, said controller having a dynamic emulation model of a hydraulic driving device;
    a control valve for controlling the working oil discharged from said capacity variable hydraulic pump;
    a hydraulic actuator adapted to be operated by the working oil from said control valve;
    an operating means for operating said hydraulic actuator; and
    a relief valve adapted to be operated when said working oil has a predetermined relief pressure or more,
    wherein said controller estimates flow rate of the working oil passing through said relief valve from said dynamic emulation model according to an operation amount of said operating means, and controls pump flow rate of said capacity variable hydraulic pump so that flow rate estimation value of said relief value gets close to zero.

2. The control device for the working machine according to claim 1, wherein said dynamic emulation model has each specification of a pressure control valve including said relief valve, said hydraulic pump, said hydraulic actuator, and said control valve within the model.

3. The control device for the working machine according to claim 2, wherein said dynamic emulation model has nonlinear characteristic of said control valve or said pressure control valve.

4. The control device for the working machine according to claim 2, further comprising a rotation speed sensor for detecting a rotation speed of an engine of said working machine.

5. The control device for the working machine according to claim 4, wherein said controller changes the discharge amount of said hydraulic pump in said emulation model according to the rotation speed detected by said rotation speed sensor.

6. The control device for the working machine according to claim 4, further comprising a front attachment provided on said working machine, and a detecting means for detecting position and work load of said front attachment.

7. The control device for the working machine according to claim 6, wherein said controller changes moment of inertia of the hydraulic actuator in said emulation model based on the position and work load of the front attachment detected by said detection means.

8. The control device for the working machine according to claim 1, wherein said controller limits change amount of the pump flow rate per unit time to a predetermined amount or less so as to prevent a sudden change in the pump flow rate of said capacity variable hydraulic pump.

9. The control device for the working machine according to claim 2, further comprising a pressure sensor provided in a return pipeline communicating with an oil tank.

10. The control device for the working machine according to claim 9, wherein said controller adjusts a pump pressure of said hydraulic pump in said emulation model based on a back pressure detected by said pressure sensor and estimates the flow rate of said relief valve based on the adjusted pump pressure and a flow characteristic of said relief valve.

11. The control device for the working machine according to claim 1, wherein said hydraulic actuator is one of a rotating motor as driving source of a rotating system, a winch motor as driving source of a hoisting system, and a traveling motor as driving source of a traveling system.

* * * * *